March 17, 1959 J. M. GAILLIOT, JR., ET AL 2,878,349
POTENTIOMETER ELEMENT CORE
Filed Sept. 20, 1956

INVENTORS
JOSEPH M. GAILLIOT JR.
CHARLES M. WOLFE, &
BY HERBERT C. BAKER

ATTORNEY

United States Patent Office 2,878,349
Patented Mar. 17, 1959

2,878,349

POTENTIOMETER ELEMENT CORE

Joseph M. Gailliot, Jr., Chino, Charles M. Wolfe, Glendora, and Herbert C. Baker, Monrovia, Calif., assignors to General Dynamics Corporation, San Diego, Calif., a corporation of Delaware Application September 20, 1956, Serial No. 610,959

13 Claims. (Cl. 201—62)

This invention relates to precision surface edges and supports and a method of fabrication and more particularly to a precision surface edge and support upon which is wound resistance wire for making potentiometer elements for potentiometers used in control, guidance and servo systems of guided missiles, aircraft, electrical computer circuits and other devices in which potentiometer type instruments are useful. This invention is particularly useful in fabricating small components wherein an edge having an inherent smoothness, hardness and resistance to wear for presenting a critical surface to the element brush or wiper of the potentiometer or to other components in related uses is highly desirable.

Heretofore the edge of a potentiometer core support over which fine wire was wound for contact with a wiper arm was machined or formed from the supporting material which was usually of a plastic filled or unfilled resin or other material capable of economical fabrication. However, because of faulty fabrication or softness of material the edge thus formed was not straight and smooth. Wire wound over such an edge did not present a uniform surface to the wiper arm such that contact was not always maintained, subjecting the instrument to possible failure at critical times. To partially correct this undesirable situation an edge of suitable material was formed and bonded to the surface of the supporting element such as by gluing, for example. However, this required additional and time-consuming operations and the element was still subject to faults or failures caused by joint fractures or by dirt entrapping crevices.

In the precision edge support and method of fabrication comprising the present invention, a bar of suitable plastic material is used for a support and is edged with a finely ground or polished cylindrical vitreous, ceramic or metallic rod whose hardness and other physical properties permit it to be machined, thereby presenting a working surface of an extremely high order of precision. This rod may be a good quality glass or similar material such as fused quartz, synthetic sapphire or other material. Under special conditions the use of metal or ceramic material might be preferable. The support of plastic material is simply but securely bonded or molded about the rod so that a strong integral part is formed.

It is an object of this invention to provide for an improved edge and support therefor.

It is another object to provide for an edge of a hard critical surface to which is bonded a support of plastic resin or other material wherein ease in fabrication of any shape is accomplished.

It is a further object to provide for a hard smooth uniform edge having a critical working surface of high precision and having a molded support therefor forming a single integral part.

It is a further object of this invention to provide for a potentiometer element having two parallel surfaces for contact with a wiper arm, wherein one surface has a return path thereon, the other of which has a resistance wire wound thereon.

A still further object is to provide for a potentiometer element having two surface supports bonded together by heating and pressing to form a unitary element, wherein one of the supports has an edge non-responsive to the bonding operation.

Other objects and features of the present invention will be readily apparent to those skilled in the art from the following specification and appended drawing wherein is illustrated a preferred form of the invention, and in which.

Figure 1:
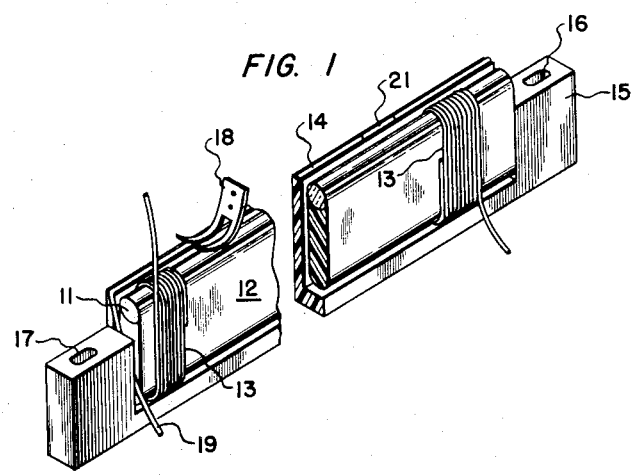
Figure 1 is a perspective showing with parts broken away to show the edge and support as part of a potentiometer element.

Referring now to the drawings wherein like numerals designate like parts throughout the several views, there is shown in Figure 1, edge 11 and support 12 forming a core upon which is wound resistance wire 13. Adjacent this core is a base support 15 having a conductive edge 14 in parallel relationship with edge 11. This base support has elongated slots 16 and 17 at each end for mounting and adjustment along the path of travel of wiper arm 18 as is more fully explained in copending application for a Ganged Potentiometer and Programming Device, Serial No. 665,706, filed June 14, 1957, of common assignee. The base support 15 is recessed along one side and intermediate its ends to receive the core upon which the wire 13 is wound. The two sections are positioned with edge 14 and the wire surfaces on edge 11 are in parallel relationship and then bonded by heating and pressing. The support 12 and base support 15 are somewhat pliable under heat and that portion of winding 13 intermediate the adjacent surfaces are embedded therein. However, edge 11 is not pliable and does not respond to the heat and pressure. Therefore, the accuracy of the edge is not impaired by the bonding operation. Wire 13 is a microfine resistive wire wound uniformly along the core to provide a linear resistance indicative of the position of wiper arm 18. However, by varying the height of the core (still maintaining the linear edge 11) or by varying the number of windings per unit area, the device may be made non-linear as desired. The windings are insulated with varnish except at point of contact with wiper arm 18 in the conventional manner. The wiper arm 18 establishes contact between the winding and conductive edge 14 which is connected to lead 19 to form the return electrical path for the element. Conductive edge 14 may be an electrically conducting coating or wire along the top edge of base support 15. If edge 14 is a coating, it may be desirable to have the coating sprayed or brushed over an edge rod similar to edge 11. However, if edge 14 is a wire it will be of diameter larger than wire 13 and because of its longitudinal position as compared to the lateral winding of wire 13, imperfections along the top edge are not critical and the use of an edge similar to 11 is not necessary. If desired, edge 14 may have an insulation coating 21 at spaced points to perform switching operations.

Figure 2:
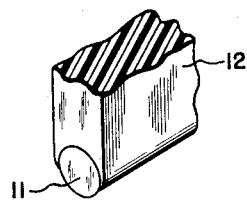
Figure 2 is an enlarged view showing the edge embedded in the support as one integral unit.

Edge 11 is better described with reference to Figure 2. Since a plastic edge does not possess the smoothness or hardness properties that permit it to be machined to the accuracy desired, improper functioning of the potentiometer would be inevitable since the resistance wire wound about an uneven core fails to present a completely linear surface to the potentiometer wiper arm. Under these circumstances a missed contact on one or two windings may cause impairment of the circuit and consequent inaccuracy of the instrument. However, with the edge 11 of a hard, smooth material capable of being machined, such as vitreous material, i. e., glass, fused quartz, synthetic ruby, sapphire, etc., it presents an infallible surface and presents complete sensitivity along the entire length of the winding. This edge is secured to its support 12 by molding such that a strong integral part is formed and the possibility of faults or failures caused by joint fractures or by dirt entrapping crevices is negligible. Here it should be noted that the support 12 is greater in thickness than the diameter of the edge 13 and the edge is embedded into the material in an amount such that less than one-half of its surface is exposed. The relatively simple and expeditious process of molding eliminates any gluing operation or bonding of the materials and thus significantly increases the rate of production.

Figure 3:
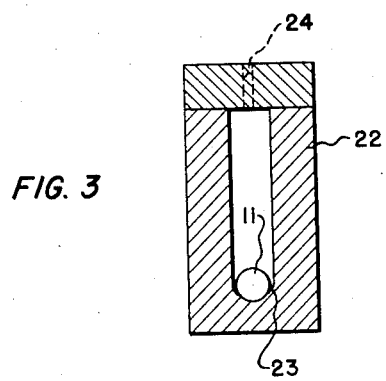
Figure 3 shows a mold for making the edge and support combination.

Fabrication of the integrally attached edge and support is accomplished by construction of a die 22 as shown in cross section in Figure 3, wherein the center portion of the bottom 23 is machined to the contour of the edge 11. When the edge 11 is placed horizontally in the bottom of the die 22, and the die is closed, plastic material can then be injected into the die through opening 24 in a conventional and well-known manner and be molded around the edge, leaving approximately one-third of its surface exposed, the remaining two-thirds of the edge being securely embedded in the plastic material.

While a simple straight connection of the edge 11, shown as a straight cylindrical rod, and its support 12 has been described in connection with its use as a potentiometer element, potentiometers and other elements requiring critical surfaces may be of other configuration than that shown. For example, they may be elliptical, I-shaped, circular, or of irregular shape as desired. Dimensions likewise will vary with the special application.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What we claim is:

1. A potentiometer element comprising an elongated thin flat plastic core support having an edge of vitreous material thereon, said edge having a hard linear smooth surface, a plurality of insulated windings wound on said support, said windings being exposed at points of contact with said edge for making electrical contact with a wiper arm movable therealong when assembled in a potentiometer.

2. A potentiometer element as in claim 1, said edge having a thickness less than the thickness of said support, said support partially surrounding said edge to expose less than one-half of the surface of said edge.

3. A potentiometer element as in claim 1, wherein said edge is of cylindrical rod shape whose cross-sectional width is less than the thickness of said support at its adjoining end, said edge being embedded axially in said end of said support in an amount greater than its radius.

4. A potentiometer element as in claim 1, a second support having an edge thereon, both said winding on said first-mentioned edge and said last-mentioned edge being in parallel relationship for engagement with said wiper arm, said supports being secured together to maintain said relationship.

5. A potentiometer element as in claim 4, said edge on said second support being grooved axially therealong to receive an electrically conducting member for engagement with said wiper arm, said electrically conducting member having non-conducting portions thereof engageable with said wiper arm.

6. A potentiometer element as in claim 4, wherein said supports are bonded together by heating and pressing, thereby embedding those portions of said winding intermediate said supports into adjacent surfaces of said supports.

7. The method of fabricating a plastic support with a vitreous edge member comprising the steps of placing a strip of vitreous material in a groove of a width smaller than the thickness of said strip to thereby expose more than half the surface area of said edge member and covering the exposed surface area with a plastic material in its fluid state.

8. Means for fabricating a plastic support with a vitreous edge comprising a container having inner surfaces shaped to the desired configuration of said support, a cylindrical elongated vitreous member of thickness less than the thickness of said support, a groove along the bottom of said container having a width less than the thickness of said vitreous member such that more than half the surface area of said member is exposed when said member is placed in said slot, and a quantity of plastic material in its fluid state for covering said exposed area and filling said container.

9. The method of fabricating a potentiometer element comprising the steps of placing a strip of vitreous material in a groove of smaller thickness to thereby expose more than half the surface of said strip, covering the exposed surface of said strip with a plastic material in its fluid state, wrapping said plastic material when hardened with a number of turns of insulated wire, forming a second support with an edge, heating and pressing said plastic material against said second support to bond them together with said strip and said edge in parallel relationship.

10. A potentiometer element comprising a winding support, said support being elongated and having a thickness, said support being of plastic material, an edge of vitreous material of less thickness than the thickness of said support, said edge being embedded axially along the top of said support at a depth such that less than half its surface is exposed, a plurality of windings on said support and edge, a second elongated support having an electrically conducting edge, said edge of vitreous material and said electrically conducting edge being positioned in parallel relationship and said winding support and said second support being secured to maintain said relationship.

11. A potentiometer element as in claim 10, said plastic material being pliable under heat, said winding support and said second support being bonded together by heating and pressing.

12. A potentiometer element comprising a core, said core including an elongated support having an edge attached thereto, windings of resistance wire thereon, said edge being of a hard material having a smooth linear precision surface, that portion of said windings adjacent said edge being exposed for contact by a potentiometer wiper arm, said edge being an elongated rod of diameter smaller than the thickness of said support, said support covering over one-half of the surface of said edge.

13. A potentiometer element comprising a hard smooth uniform edge capable of being ground to high precision and a molded support therefor forming a unitary integral part, said support covering at least half the surface area of said edge.

References Cited in the file of this patent

UNITED STATES PATENTS

| | | |
|---|---|---|
| 1,548,305 | Dalton | Aug. 4, 1925 |
| 2,256,727 | Sloane | Sept. 23, 1941 |
| 2,668,867 | Ekstein | Feb. 9, 1954 |
| 2,743,408 | Schmitt | Apr. 24, 1956 |
| 2,759,080 | Bourns | Aug. 14, 1956 |